United States Patent [19]

Ivani

[11] 3,900,250

[45] Aug. 19, 1975

[54] SEMI-RIGID, GAS PERMEABLE CONTACT LENSES

[75] Inventor: Edward J. Ivani, Brooklyn, N.Y.

[73] Assignee: Rynco Scientific Corporation, Floral Park, N.Y.

[22] Filed: Oct. 26, 1973

[21] Appl. No.: 410,255

[52] U.S. Cl. ............................. 351/160; 351/160
[51] Int. Cl.² ........................................ G02C 7/04
[58] Field of Search ................... 351/160, 161, 162

[56] References Cited

UNITED STATES PATENTS

| 3,710,796 | 1/1973 | Nufe | 351/160 |
| 3,718,383 | 2/1973 | Moore | 351/160 |

*Primary Examiner*—Craig E. Church
*Attorney, Agent, or Firm*—Haseltine, Lake & Waters

[57] ABSTRACT

A semi-rigid, gas permeable, concave-convex corneal-type contact lens formed essentially of a transparent, optically clear cellulose acetate butyrate.

1 Claim, 1 Drawing Figure

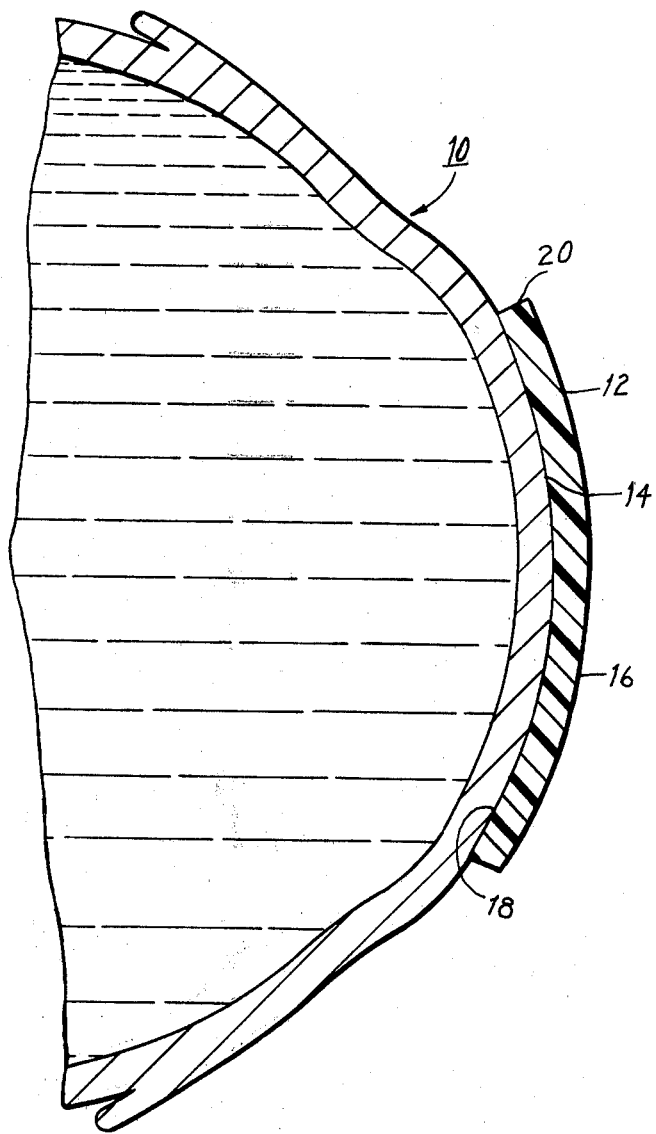

SEMI-RIGID, GAS PERMEABLE CONTACT LENSES

FIELD OF THE INVENTION

The present invention relates to a semi-rigid, gas permeable contact lens and, more particularly, a generally concave-convex contact lens constituted essentially of transparent, optically clear cellulose butyrate.

DISCUSSION OF THE PRIOR ART

Contact lenses formed of plastic materials and providing for the required optical properties are widely known and utilized in the art. Basically, contact lenses fall into two major categories, in effect, soft contact lenses and hard or essentially semi-rigid contact lenses. Difficulties have been encountered with soft contact lenses in that these frequently tend to distort during use, thereby tending to cling or adhere to the cornea and rendering removal of the lenses to be difficult. Moreover, the deformation or distortion of the soft contact lenses also results in a corresponding distortion of the corrective curvatures imparted to the lenses so as to make these less than satisfactory. Additionally, contact lenses of known construction are frequently insufficiently gas-permeable, in effect, occasioning a buildup of harmful gaseous substances between the surface of the cornea in the region covered by the contact lens, and frequently resulting in extensive physical damage to the eye.

Concerning the presently known hard or semi-rigid contact lenses, although these have proven themselves to be generally more satisfactory and less troublesome in use than soft contact lenses, the various types of plastic materials currently employed fail to provide either the required gas permeability, optical properties and transparency, non-toxicity or compatibility with the corneal tissue which they contact, which would be necessary in order to allow for the complete comfort of the wearer of the lens.

SUMMARY OF THE INVENTION

In order to ameliorate or obviate the drawbacks and shortcomings encountered in prior art contact lenses of either major category, the present invention provides for a novel and unique contact lens, and in particular, a semi-rigid, gas-permeable corneal-type contact lens which is adapted to be applied to the human eye for correcting visional deficiencies, and which concurrently eliminates various deleterious physiological effects produced by presently available contact lenses, of both the soft and hard types.

In connection with the foregoing, the inventive semi-rigid, gas-permeable contact lens is formed essentially of a transparent, optically clear, and semi-rigid, cellulose butyrate material. Thus, the cellulose butyrate material, which has been polymerized, evinces excellent properties for use as contact lenses, as well as for conventional optical lenses. In particular, an essential characteristic of the material employed in contact lenses consists of in that the cellulose butyrate or plastic material must be optically clear, non-toxic and permeable to gases so as to permit the ready through-passage of oxygen and carbon dioxide, and concurrently have a low water absorption rate. Furthermore, the lens material must be machinable and moldable, semi-flexible or semi-rigid, and strongly resistant to acids, grease and oil of the type secreted by the human eye. Additionally, the material must have a high index of refraction, excellent light transmission characteristics, and be pathologically compatible with the eye tissue with which the contact lens comes into contact.

The foregoing essential physical properties and characteristics are all possessed by the cellulose butyrate contemplated herein for the application to contact lenses. In addition, cellulose butyrate may be readily tinted so as to reduce excessive and annoying glare and flare encountered in many presently used plastic contact lenses. Respecting the gas-permeability rate of cellulose butyrate as employed in contact lenses, this has been determined to be clearly more than adequate for human requirements.

Thus, when the oxygen uptake, and the removal of carbon dioxide from the cornea have been reduced or restricted for a prolonged period of time, as is frequently the case in various prior art contact lenses during continuous use thereof, the cornea becomes edemous. The aggregation of any gaseous carbon dioxide in the region of the contact lens contacting the cornea, causes the epithilium to wrinkle and form craters so as to thereby impede vision. In clear contrast to the foregoing, the gas permeable nature of the cellulose butyrate material facilitates the ready interchange of oxygen and carbon dioxide gases between the cornea and the surrounding atmosphere, thereby permitting the normal and essential metabolic processes to continue within the cornea.

Moreover, cellulose butyrate is particularly and advantageously adapted to form semi-rigid contact lenses which are essentially flexible and bendable so as to be practically unbreakable in normal use, while concurrently being sufficiently rigid and hard so as to be completely and easily machinable. Cellulose butyrate further possesses optical transparencies having a degree of clarity similar to that of, or superior to, presently used polymethyl-methacrylate material employed for contact lenses.

The semi-rigid or semi-flexible properties of the cellulose butyrate being essentially somewhat more flexible than a completely rigid material but less flexible than commonly used soft contact lenses, prevents any irritation upon contact of the lens with the eye during the initial stages of adaptation of the latter to the contact lens, or during the permanent wearing thereof. Furthermore, the high resistance of cellulose butyrate to acid, grease, and oil secreted by the human eye, which tend to smudge the surface of the contact lens, also enhances its excellent optical clarity characteristics.

Cellulose acetate butyrate, when employed in contact lenses, possesses excellent light transmission characteristics, and may be readily tinted pursuant to prescription so as to reduce annoying glare and flare which are prevalent in many present contact lenses, in which a so-called "rainbow" effect is produced about the lens peripheries. The ready machinability and workability of cellulose acetate butyrate permit the contact lenses formed therefrom to be made from pelletized material or which may be molded through extrusion or pressure molding, injection molded, or formed from suitable sheet or rod bar stock.

BRIEF DESCRIPTION OF THE DRAWING

Referring now in particular to the drawing, the single FIGURE illustrates a semi-rigid, gas-permeable contact lens formed in accordance with the present invention.

DETAILED DESCRIPTION

In particular, the drawing discloses a human eye 10 having a corneal-type, concave-convex contact lens 12 positioned in place over the cornea 14. The contact lens 12 has a generally convex outer surface 16 and a concave inner surface 18 having a configuration adapted closely follow the outer surface of the cornea 14, and with the contact lens being ground to the precise vision-corrective curvature required by the particular individual user. The peripheral edge 20 of the contact lens 12 may be rounded off or shaped as required, as is commonly known in the art, in order to assure the maximum comfort to the user during the wearing of the lens. The contact lens 12, as indicated hereinabove, is formed essentially or cellulose acetate butyrate, which is an organic cellulose ester.

The organic cellulose esters are produced by the reaction between chemical cellulose and the appropriate acid and anhydrides in the presence of a suitable chemical catalyst, usually sulfuric acid. The cellulose employed is usually pretreated so as to make it more chemically active and to thereby shorten the reaction time. The reaction is allowed to proceed virtually to completion-the triester stage (all three hydroxyl groups in each pyranose ring of the cellulose chain substituted.) Since the cellulose is fibrous, the reaction is not homogeneous until it is almost complete, and only by allowing it to proceed until the ester is totally dissolved is it possible to produce a uniform homogeneous product.

The process used for making cellulose acetate butyrate includes taking bleached cotton linters or pulp similar to that used in manufacturing of cellulose acetate and to treat it for 12 hours with 40–50% sulphuric acid, which after drying is followed by acetic acid treatment for an additional 15 hours. Esterification is then effected by treatment at a temperature of 30°–50°C with a mixture of butyric acid, acetic anhydride and 0.5% of concentrated sulphuric acid catalyst, until the cellulose fiber structure has completely disappeared.

A particular advantage and adaptability of cellulose acetate butyrate for use in the production of corneal-type contact lenses according to the present invention has been ascertained in that, by utilizing the cellulosic structure, a gas-permeable plastic is formed. Gas permeability in a plastic is due to the linearity of the molecular chain, non-polarity of the chain, and several other factors. The cellulosic group form polymer chains which meet the requirement of being gas-permeable.

The cellulose acetate butyrate, as set forth hereinabove, provides for highly satisfactory gas permeability characteristics which will permit the ready through-passage of oxygen and carbon dioxide. This high degree of gas-permeability is particularly important in contact lenses since it readily allows for a gas exchange through the contact lens between the cornea and the ambient environment externally of the contact lens. Consequently, this excellent lens gas-permeability and resultant gas exchange readily and appreciably reduces the extent of asphyxiation experienced by corneal tissue, thereby allowing the contact lens to be worn for extensive and even almost unlimited periods of time, without any appreciable harm or discomfort being experienced by the eye of the lens' user.

The oxygen consumption rate of the human corneal epithelium is approximated to be 2.8 ml/cm$^2$-hr. at a temperature of 33°C. This value has been determined by Jauregui and Fatt, "Estimation of the Vivo Oxygen Consumption of the Human Corneal Epithelium," in the American Journal of Optometry and Archives of American Academy of Optometry, June 1972, page 507.

The rate of oxygen transmission through a cellulose acetate butyrate film one mil. thick is approximately 60 ml/cm$^2$-hr. Since the material employed in contact lenses has a thickness of generally approximately 7 mls, the rate for a 7 mils thick lens is 7–75 ml/cm$^2$-hr. This value greatly exceeds the oxygen requirements of the eye, as provided for in the literature published by Jauregui and Fatt. Consequently, by using cellulose acetate butyrate material for contact lenses, the eye can evidently undergo normal metabolism.

Extensive animal testing experiments conducted on rabbits, under adverse conditions, indicated that in all instances, when utilizing the cellulose acetate butyrate material for the contact lenses, these evinced a corneal and tissue response which was much better than that obtained with currently available conventional rigid or hard lens as well as with soft lens material. This range of pathology tests clearly showed superior properties for cellulose acetate butyrate, both as to degree of comfort and lack of irritation encountered in contrast with presently used contact lenses.

While there has been shown what is considered to be the preferred embodiment of the invention, it will be obvious that modification may be made which come within the scope of the disclosure of the specifications.

What is claimed is:

1. A semi-rigid, gas-permeable contact lens of generally concave-convex cross-section having the concave surface thereof substantially conforming to the cornea of the eye, said lens being formed of transparent, optically clear cellulose acetate butyrate.

* * * * *